United States Patent [19]

Shimada et al.

[11] Patent Number: 4,658,595
[45] Date of Patent: Apr. 21, 1987

[54] COOLING SYSTEM FOR RADIATOR AND CONDENSER OF VEHICLES WITH AN AIR CONDITIONER AND METHOD OF OPERATING THE SAME

[75] Inventors: Yukio Shimada; Yutaka Obata; Takahisa Takeoka, all of Ebina; Toyotoshi Katoh, Yokohama, all of Japan

[73] Assignee: Nissan Motor Co., Ltd., Yokohama, Japan

[21] Appl. No.: 801,807

[22] Filed: Nov. 26, 1985

[30] Foreign Application Priority Data

Nov. 29, 1984 [JP] Japan .................. 59-250499

[51] Int. Cl.$^4$ .................. F01P 7/02
[52] U.S. Cl. .................. 62/179; 62/183; 236/35
[58] Field of Search .................. 236/35; 62/179, 183; 123/41.12, 41.49

[56] References Cited

U.S. PATENT DOCUMENTS

4,036,432 7/1977 George .................. 236/35
4,425,766 1/1984 Claypole .................. 123/41.12 X

FOREIGN PATENT DOCUMENTS

0156710 12/1980 Japan .................. 62/183
56-21214 2/1981 Japan .
57-42095 9/1982 Japan .

*Primary Examiner*—William E. Wayner
*Attorney, Agent, or Firm*—Schwartz, Jeffery, Schwaab, Mack, Blumenthal & Evans

[57] ABSTRACT

A cooling system for radiator and condenser with an air conditioner having first and second electrically driven blowers for cooling the radiator and condenser, and a cooling cycle operation switch which comprises a control circuit provided on at least one side of the first and second blowers for either stopping or operating at low speed the one of the first and second blowers when any electrical equipment of vehicle such as headlights, wipers, is operated during the cooling cycle, an engine cooling water temperature switch operative to turn on and off the first blower by releasing the control of the control circuit when any of the electrical equipments is operated, and/or a thermal load switch operative to turn of and off the second blower in accordance with the outside temperature conditions by releasing the control of the control circuit, when any of the electrical equipments is operated. With this construction, the blowers for the radiator and condenser can be efficiently operated in accordance with the conditions of the engine cooling water temperature, the outdoor temperature, and the operated or non-operated conditions of the electrical equipments of a vehicle, so as to save electrical power generated by a generator or batteries of the vehicle.

15 Claims, 5 Drawing Figures

COOLING SYSTEM FOR RADIATOR AND CONDENSER OF VEHICLES WITH AN AIR CONDITIONER AND METHOD OF OPERATING THE SAME

BACKGROUND OF THE INVENTION (1) Field of the Invention

The present invention relates to a cooling system for radiator and condenser for vehicles with an air conditioner using two electrically driven blowers for cooling the radiator and condesner and a method of operating the same.

2. Description of the Prior Art

In general, within the engine compartment of a vehicle with an air conditioner, there is provided a radiator for cooling the engine water and a condenser for condensing the coolant in a cooling recycle system which are justapositioned at the front of the engine and first and second electrically driven blowers for cooling the radiator and the condenser as a radiator blower and a condenser blower. This kind of the cooling system is disclosed, for example, in Japanese Patent Disclosure No. 57-42095.

These blowers are always operated when the cooling recycle system is turned on so as to demonstrate the maximum condensing performance of the condenser while when the cooling recycle system is turned off only the radiator blower is on-off controlled by a water temperature switch which is turned on and off in accordance with high or low temperature conditions of the engine cooling water.

In the cooling system according to the prior art as described above, however, since the two blowers are always operated when the cooling recycle system is turned on so that when electrical equipment for the vehicle such as headlights, wipers are operated together with the operation of the blowers, generated electric power from a generator or alternator exceeds the power rating of the alternator. Accordingly, there were problems that the batteries of vehicles tend to be exhausted due to over-discharge of batteries or the noise of the blowers becomes large because the two blowers are operated at maximum capacity.

SUMMARY OF THE INVENTION

It is therefore an object of the present invention to provide a cooling system for radiator and condenser of vehicles with an air conditioner in which the electric power generated by a generator or alternator can be saved and can effectively be used.

It is another object of the present invention to provide a cooling system for radiator and condenser of vehicles with an air conditioner in which when any one of the switches for electrical equipment such as headlights, wipers is operated, the blowers for radiator and condenser are efficiently operated so as to save energy from the generator, with the cooling performance of the radiator and condenser being maintained.

It is still another object of the present invention to provide a cooling system for radiator and condenser of vehicles with an air conditioner in which an engine cooling water temperature switch and/or a thermal load switch are provided and the blowers for the radiator and condenser are effectively operated in accordance with the conditions of the above switches together with the operated or non-operated conditions of the electrical equipment so as to save the energy from the alternator.

It is yet still another object of the present invention to provide a method of operating a cooling system having first and second electrically driven blowers for the radiator and condenser of an air conditioner for vehicles in which the blowers for the radiator and consenser are effectively controlled in accordance with the conditions of the engine cooling water temperature, the outside temperature, and the operated or non-operated conditions of the electrical equipment of the vehicle so as to save electric power from the alternator or batteries of the vehicle.

One feature of the present invention resides in the cooling system for radiator and condenser of vehicles with an air conditioner having a first blower and a second blower for cooling the radiator and the condenser so as to cool the engine cooling water and so as to condense the coolant and a cooling cycle operation switch which comprises: engine cooling water temperature switch connected between a power supply and the first blower and turned on and off in accordance with high and low temperature conditions of the engine cooling water; relay switching means for controlling the first and second blowers in accordance with the on-off conditions of the cooling cycle operation switch; and a control circuit having an on-off switch and a solenoid, and connected between the relay switching means and either the first or the second blower, the solenoid of the control circuit being connected to switches for electrical equipment such as headlights, wipers; whereby when any one of the switches for the electrical equipment of the vehicle is turned off, the first and second blowers are operated at normal speed through the relay switching means and the control circuit, during the cooling cycle, while when any one of the switches for the electrical equipment is turned on, the first blower is on-off controlled through the engine cooling water temperature switch and the second blower remains operated through the relay switching means.

Another feature of the present invention resides in the method of operating a cooling system for radiator and condenser of a vehicle with an air conditioner having first and second blowers, a control circuit provided on at least one side of the first and second blowers for releasing or operating the one of the blowers at low speed, an engine cooling water temperature switch operative to turn on and off the first blower in accordance with the temperature conditions of the engine cooling water, and/or a thermal load switch operative to turn on and off the second blower in accordance with the outside temperature conditions, which comprises the steps of: operating the first and second blowers during the cooling cycle when no electrical equipment of the vehicle is operated; energizing the control circuit when any of the electrical equipment is operated during the cooling cycle and for releasing the control of the first blower; operating the first blower in accordance with the on-off conditions of the engine cooling water temperature switch during the cooling cycle; and operating the first blower at low speed through the control circuit when the engine cooling water temperature switch is in the off-condition.

According to the present invention, when any of the electrical equipment of a vehicle is operated and electric power is consumped, at least one of the blowers for the radiator and condenser is stopped or operated at low speed by control circuit, excessive consumption of the power generated by a generator is thus prevented. However, the blower which has been stopped or operated at low speed by the control circuit, can also be operated at normal speed in accordance with the increase in the engine cooling water temperature above a predetermined temperature through a water temperature switch, even when any of the electrical equipment is operated, thus preventing an overheat condition of the engine.

Moreover, when a thermal load to the condenser becomes large, the blower which has been stopped or operated at low speed by the control circuit can now be operated at normal speed, thereby securing the cooling performance of the air-conditioner, with the condensivity or condensing effectiveness of the condenser being maintained.

These and other objects, features and advantages of the invention be better understood from the following detailed description of the invention with reference to the accompanying drawings.

DESCRIPTION OF THE PREFERRED EMBODIMENT

Figure 1:
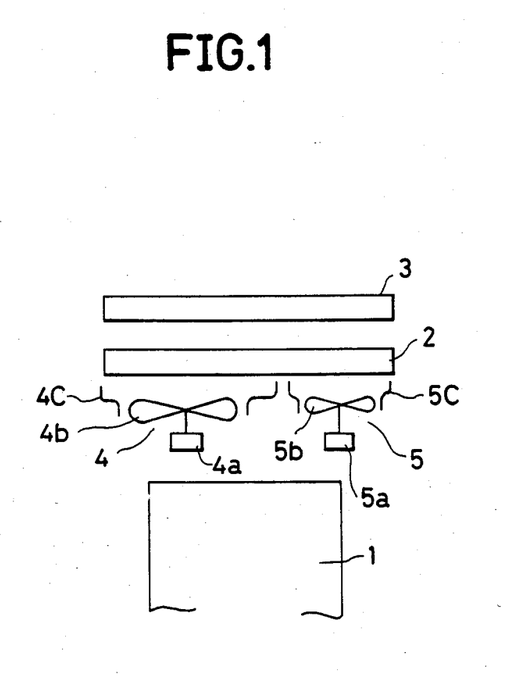
FIG. 1 illustrates a positional relationship of the arrangement of an engine, radiator and condenser, and radiator side blower and condenser side blower with blower motors coupled thereto, according to one embodiment of the present invention.

An embodiment of the invention will now be described, referring to FIG. 1 and FIG. 2.

The general configuration of this embodiment will first be described. In FIG. 1, reference numeral 1 denotes a water-cooled type of engine. A radiator 2, for cooling the engine cooling water, and a condenser 3 for condensating the coolant medium of the vehicle air conditioning system, are successively positioned at the front of the vehicle along the front-to-rear axis of the vehicle. An electrically driven radiator air blower 4 for cooling radiator 2 and condensor 3 constitute a first electrically powered blower, and an electrically driven condenser blower 5 a second electrically powered blower. The blowers 4 and 5 comprise motors 4a and 5a respectively, with fans 4b and 5b respectively coupled thereto, together with shrouds 4c and 5c for directing the flows produced by blowers 4 and 5 respectively.

Figure 2:
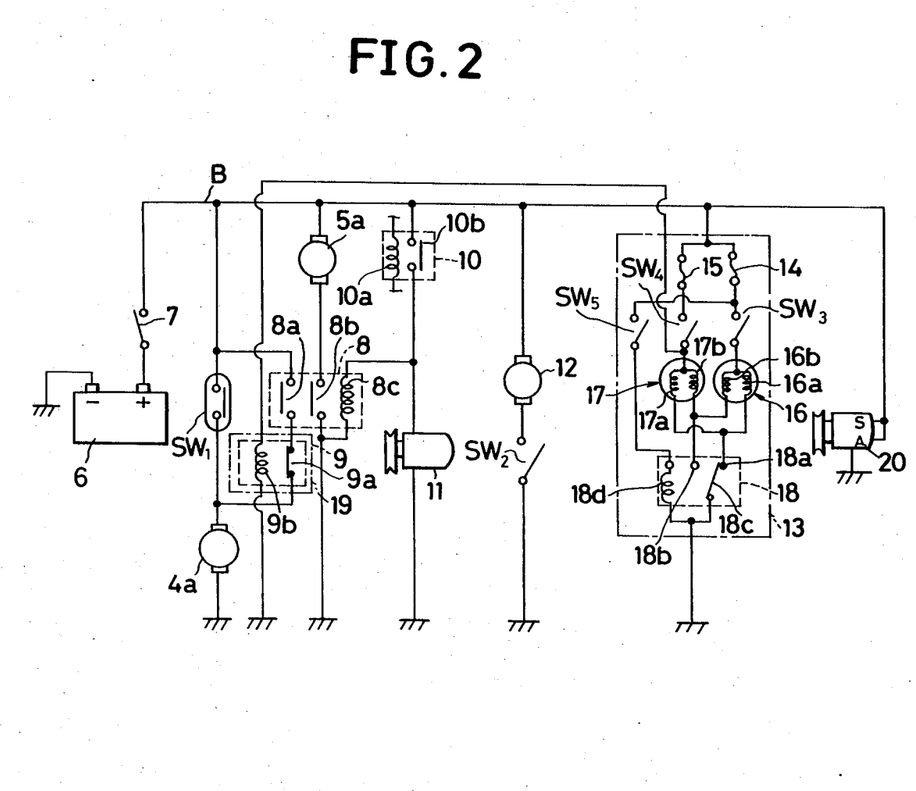
FIG. 2 illustrates an electrical circuit diagram of one embodiment according to the present invention.

FIG. 2 shows an electrical circuit diagram of a cooling apparatus according to the present invention. In FIG. 2, numeral 6 denotes a battery, with a power supply line B being connected to battery 6 through an ignition switch 7. The power supply line B is coupled to a terminal of motor 4a of radiator blower 4 through a water temperature switch SW1. The other terminal of motor 4a is connected to ground potential. The water temperature switch SW1 is designed to be in the closed state when the temperature of the engine cooling water is higher than a predetermined temperature value (for example, 90° C.). A first pair of normally open contacts 8a of a first relay 8 and a pair of normally closed contacts 9a of a second relay 9 are mutually connected in series, with the these series-connected relay contacts being connected in parallel with water temperature switch-SW1.

One terminal of motor 5a of blower 5 is connected to power supply line B. The other terminal of motor 5a is connected to ground potential, through a second pair of normally open contacts 8b of the above-mentioned first relay 8. Numeral 10 denotes a third relay for starting the cooling cycle operation, having a solenoid or drive coil 10a and a pair of normally open contacts 10b, which are closed when drive coil 10a is energized. One of the normally open contacts 10b of third relay 10 is connected to power supply line B, while the other contact is connected to one terminal of an air conditioner system compressor 11. The other terminal of compressor 11 is connected to ground potential. One terminal of the drive coil 8c of first relay 8 is connected to the junction of one of the normally open contacts 10b of third relay 10 and compressor 11, while the other terminal of drive coil 8c is connected to ground potential. Reference numeral 12 denotes a blower motor, for vehicle passenger compartment ventilation. One terminal of motor 12 is connected to power supply line B while the other terminal is connected through fan switch SW2 to ground potential.

Numeral 13 denotes a headlight circuit. In this circuit, headlight switches SW3 and SW4 are connected in parallel through fuses 14 and 15 respectively to power supply line B, and also are respectively connected to headlights 16 and 17. The headlights 16 and 17 include low-beam filaments 16a and 17a respectively and high-beam filaments 16b and 17b respectively. The low-beam filaments 16a and 17a are each connected to a "break" contact 18a of a headlight relay 18, while the high-beam filaments 16b and 17b are both connected to the "make" contact 18b of headlight relay 18. A terminal 18c of headlight relay 18 is connected to ground potential, while one terminal of solenoid or drive coil 18d of headlight relay 18 is connected to a headlight switch SW5 which serves to execute changeover between low-beam and high-beam operation of the headlights. The other terminal of drive coil 18d is connected to ground potential.

One terminal of solenoid or drive coil 9b of the second relay 9 is connected to the junction of headlight switch SW4 and headlight 17. The other terminal of drive coil 9b is connected to ground potential. In the present embodiment, second relay 9 constitutes a control circuit 19. It should be noted that it would be equally possible to connect one terminal of drive coil 9b to the junction of headlight switch SW5 and headlight 16. Numeral 20 denotes an alternator, which is rotated by engine 1 to charge battery 6.

The operation of this embodiment will now be described. Firstly, when the ignition switch 7 is closed, engine 1 is started. The headlights 16 and 17 are switched off at this time, i.e., both of headlight switches SW3 and SW4 are set in the open state, whereby the contacts of second relay 9 are held closed. In this condition, if the vehicle air conditioner cooling is set in operation, drive coil 10a of the third relay 10 will be energized, whereby the normally open contacts 10b are closed. As a result, the compressor 11 is set in operation while at the same time drive coil 8c of the first relay 8 is energized. This causes the first and second pairs of normally open contacts 8a and 8b to be closed. Hence, motor 5a of condenser blower 5 is driven, while in addition the motor 4a of radiator blower 4 is driven irrespective of the engine cooling water temperature. If on the other hand the vehicle air conditioner cooling is not set in operation, then the first and second pairs of normally open contacts of first relay 8 will be left in the open state, whereby motor 5a of condenser blower 5 will of course be held in the off state. In addition, motor 4a of radiator blower 4 will either be held in the stationary state or is driven, depending upon whether the engine cooling water temperature is high or low, i.e., in accordance with whether water temperature switch SW1 is closed or open. In this way, when headlights 16 and 17 are off, with the vehicle air conditioner cooling in operation, i.e., the relay 10 is operated, both of the blowers 4 and 5 are set in operation. As a result, the efficiency of the vehicle air conditioner cooling system is enhanced, while in addition since no power is consumed by headlights 16 and 17, the overall level of power consumption will not exceed the generating capacity of alternator 20, so that battery 6 will not enter the discharge state.

If headlight switches SW3 and SW4 are both closed, to switch on both of headlights 16 and 17, then current will flow in the drive coil 9b of second relay 9. As a result, the normally closed contacts 9a will be opened. In this condition, if the vehicle air conditioner cooling is set in operation, i.e., the third relay 10 is operated, the motor 5a of condenser blower 5 will be switched on, whereas motor 4a of radiator blower 4 will be either halted or set in operation depending upon whether the engine cooling water temperature is high or low, i.e., in accordance with whether water temperature switch SW1 is closed or open. If on the other hand the vehicle air conditioner cooling is not set in operation, i.e., the relay 10 is not operated, then in addition to motor 5a of condenser blower 5 being switched off, motor 4a of radiator blower 4 will be set to either the operative or inoperative state in accordance with whether water temperature switch SW1 is closed or open.

In this way, when headlights 16 and 17 are both switched on, then even if the vehicle air conditioner cooling is in operation, motor 4a of radiator blower 4 will be switched off by means of control circuit 19 if the engine cooling water temperature is low. Thus, if power is being consumed by headlights 16 and 17, the extent of simultaneous operation of both of motors 4a and 5a is reduced. This serves to prevent battery 6 entering the discharge state, while in addition reducing the amount of acoustic noise which is generated. If on the other hand the temperature of the engine cooling water is high, then the water temperature switch SW1 will cause control circuit 19 to set radiator blower 4 in operation, whereby a flow of air through radiator 2 is maintained, to prevent overheating of engine 1.

The above relationships are expressed in Table 1 below.

TABLE 1

| Headlights 16 and 17 | Cooling Cycle | Cooling Water Temperature | Radiator Motor 4a | Condenser Motor 5a |
|---|---|---|---|---|
| OFF State | OFF | Low (Normal) | OFF | OFF |
|  |  | High | ON (Hi) |  |
|  | ON | Low (Normal) | ON (Hi) | ON |
|  |  | High | ON (Hi) |  |
| ON State | OFF | Low (Normal) | OFF | OFF |
|  |  | High | ON (Hi) |  |
|  | ON | Low (Normal) | OFF | ON |

TABLE 1-continued

| Headlights 16 and 17 | Cooling Cycle | Cooling Water Temperature | Radiator Motor 4a | Condenser Motor 5a |
|---|---|---|---|---|
|  |  | High | ON (Hi) |  |

Figure 3:
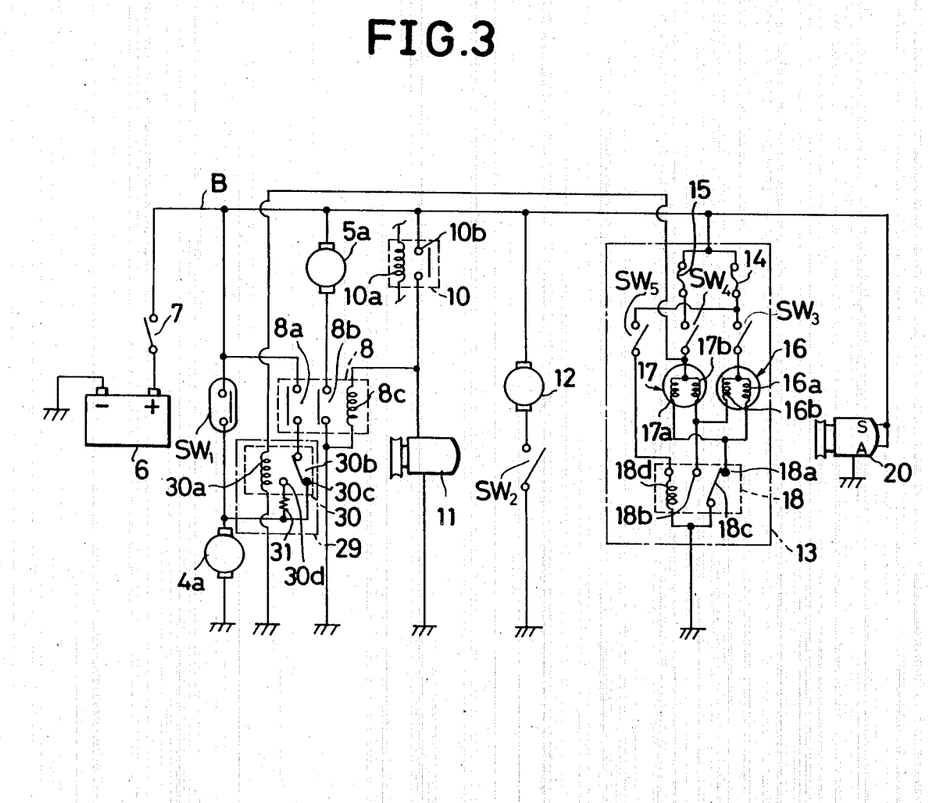
FIG. 3 illustrates an electrical circuit diagram of a second embodiment according to the present invention.

FIG. 3 shows a second embodiment of the present invention. In this embodiment, control circuit 29 differs from control circuit 19 of the first embodiment described above, in that a second relay 30 which is of changeover type is used in place of second relay 9 of the first embodiment. In addition, a resistor 31 is added to this second embodiment.

More specifically, one terminal of the drive coil 30a of second relay 30 is connected to the junction of headlight switch SW4 and headlight 17, as in the first embodiment, while the other terminal of drive coil 30a is connected to ground potential. Furthermore, an armature 30b of second relay 30 is connected to one of the first normally open contacts 8a of first relay 8, while the "break" contact 30c of second relay 30 is connected to one terminal of motor 4a of radiator blower 4, while the "make" contact 30d is connected through resistor 31 to the latter terminal of motor 4a.

With this configuration, if headlights 16 and 17 are both switched on, so that an energizing current is passed through drive coil 30a of relay 30, armature 30b will become connected to "make" contact 30d. If the vehicle air conditioner cooling is set in operation in this condition, then if the temperature of the engine cooling water is low so that water temperature switch SW1 is open, drive current will be supplied to motor 4a through resistor 31, causing motor 4a to rotate at low speed. In this way, when power is being consumed by headlights 16 and 17, if both of motors 4a and 5a are in operation, the overall level of electrical power consumption is reduced due to the fact that motor 4a is driven at low speed, so that battery 6 is prevented from entering the discharge state.

If on the other hand the engine cooling water temperature is high, when headlights 16 and 17 are switched on, then the radiator blower 4 is set in operation by water temperature switch SW1, to thereby prevent overheating of the engine. The above relationships are expressed in Table 2 below.

TABLE 2

| Headlights 16 and 17 | Cooling Cycle | Cooling Water Temperature | Radiator Motor 4a | Condenser Motor 5a |
|---|---|---|---|---|
| OFF State | OFF | Low (Normal) | OFF | OFF |
|  |  | High | ON (Hi) |  |
|  | ON | Low (Normal) | ON (Hi) | ON |
|  |  | High | ON (Hi) |  |
| ON State | OFF | Low (Normal) | OFF | OFF |
|  |  | High | ON (Hi) |  |
|  | ON | Low (Normal) | ON (Low) | ON |
|  |  | High | ON (Hi) |  |

The remaining portions of this embodiment are identical to those of the first embodiment described above, and further description will be omitted.

Figure 4:
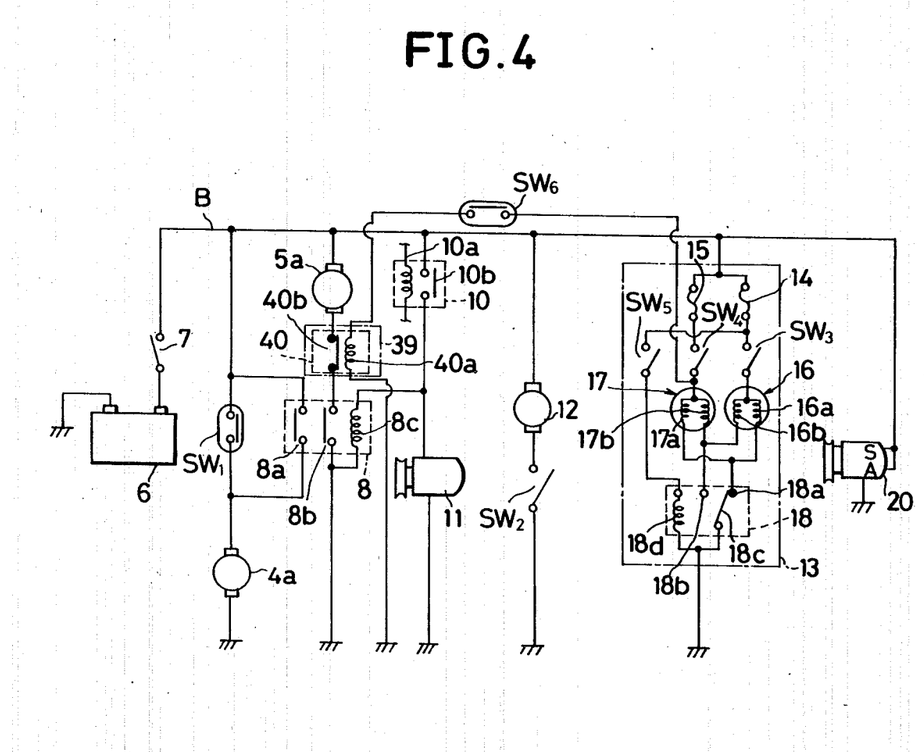
FIG. 4 illustrates an electrical circuit diagram of a third embodiment according to the present invention.

FIG. 4 shows a third embodiment of the present invention. The control circuit 39 of this embodiment includes a second relay 40, and an outside air temperature switch SW6 which constitutes a thermal load switch. One terminal of the drive coil 40a of second relay 40 is connected through the outside temperature switch SW6 to the junction of headlight switch SW4 and headlight 17. The other terminal of drive coil 40a is connected to ground potential. When the outside temperature is low, the outside temperature switch SW6 is set in the closed state, while when the air temperature is high this switch is opened. In addition, the normally closed contacts 40b of second relay 40 are connected to the junction of motor 5a of condenser blower 5 and the second normally open contacts 8b of first relay 8.

With this configuration, when the vehicle air conditioner cooling is set in operation while headlights 16 and 17 are switched on, with the outside temperature being low (i.e., with a low level of thermal load applied to condenser 3), the outside temperature switch SW6 is closed while drive coil 40a of second relay 40 is energized, so that the normally closed contacts 40b are opened. Motor 5a of condenser blower 5 is thereby set in the OFF state. If on the other hand, with the vehicle air conditioner cooling in operation and headlights 16 and 17 switched on, if the outside temperature is high (so that a high level of thermal load is applied to condenser 3), then air temperature switch SW6 will be in the open state. As a result, the normally closed contacts 40b of second relay 40 will be held in the closed state, so that both of the motors 4a and 5a of blowers 4 and 5 respectively will be set in rotation at high speed. In this way, if the outside temperature is low, so that only a low level of thermal load is placed on condenser 3, motor 5a is set in the OFF state. Thus, if power is being consumed by headlights 16 and 17, simultaneous operation of both of motors 4a and 5a is minimized as far as possible, to prevent battery 6 entering the discharge state. On the other hand, when the ambient air temperature is high (so that a high level of thermal load is applied to condenser 3), even if both of headlights 16 and 17 are switched on, motor 5a will be driven through the outside temperature switch SW6. Thus the condensation effectiveness of condenser 3 is maintained, to ensure a satisfactory level of vehicle air conditioner cooling system effectiveness.

The relationships described above are shown in Table 3 below.

TABLE 3

| | (air conditioner cooling ON) | |
|---|---|---|
| Headlights 16 and 17 | Outside Temperature | Condenser Motor 5a |
| OFF State | Low | ON (Hi) |
| | High | ON (Hi) |
| ON State | Low | OFF |
| | High | ON (Hi) |

The remainder of this embodiment is identical to the first embodiment described above, and further description will be omitted.

Figure 5:
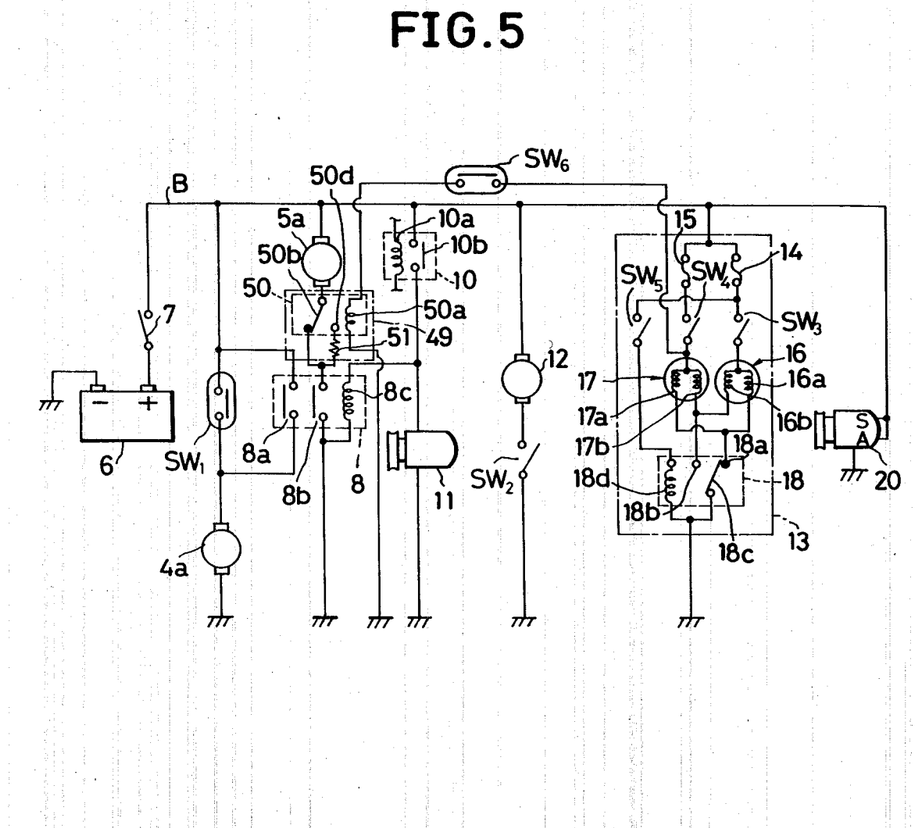
FIG. 5 illustrates an electrical circuit diagram of a fourth embodiment according to the present invention.

FIG. 5 shows a fourth embodiment of the present invention, in which a control circuit 49 includes a second relay 50 which is of changeover type, and a resistor 51. Control circuit 49 further includes an air temperature switch SW6, which functions as a thermal load switch. One terminal of drive coil 50a of second relay 50 is connected through air temperature switch SW6 to the junction of headlight switch SW4 and headlight 17, while the other terminal of drive coil 50a is connected to ground potential. The armature 50b of second relay 50 is connected to a terminal of motor 5a of condenser blower 5, while the "break" contact 50c of relay 50 is connected to the second normally open contacts 8b of first relay 8 and the "make" contact 50d of relay 50 is connected through resistor 51 to the second normally open contacts 8b of relay 8.

With this configuration, when the vehicle air conditioner cooling is in operation i.e., the relay 10 is operated and headlights 16 and 17 are switched on, if the outside temperature is high (i.e., only a low level of thermal load applied to condenser 3), then the air temperature switch SW6 will be closed while at the same time armature 50b is attracted by drive coil 50a of second relay 50 to come into contact with the "make" contact 50d. As a result, motor 5a is driven by current which passes through resistor 51. Motor 5a is thereby rotated at low speed. If on the other hand, with the vehicle air conditioner cooling in operation and headlights 16 and 17 switched on, if the air temperature is high (i.e., a high level of thermal load applied to condenser 3), then the outside temperature switch SW6 will be set in the open state so that armature 50b is held in contact with the "break" contact 50c of relay 50. As a result, both of motors 4a and 5a of air blowers 4 and 5 respectively will be rotated at high speed. In this way, if the outside temperature is low, so that the thermal load applied to condenser 3 is negligible, motor 5a is rotated at low speed. Thus, with both of headlights 16 and 17 consuming power, even if both of motors 4a and 5a are in operation, motor 5a is rotated at low speed so that the occurrence of the condition in which both of motors 5a and 4a are rotating at high speed is minimized. This will prevent battery 6 entering the discharge state. On the other hand, when the outside temperature is high (so that a high level of thermal load is applied to condenser 3), even if both of headlights 16 and 17 are switched on, motor 5a will be driven through air temperature switch SW6. Thus the condensation effectiveness of condenser 3 is maintained, to ensure a satisfactory level of vehicle air conditioner cooling system effectiveness.

The above relationships are shown in Table 4 below.

TABLE 4

| | (air conditioner cooling ON) | |
|---|---|---|
| Headlights 16 and 17 | Outside Temperature | Condenser Motor 5a |
| OFF State | Low | ON (Hi) |
| | High | ON (Hi) |
| ON State | Low | ON (Low) |
| | High | ON (Hi) |

The water temperature switch SW1 is used in both the third and the fourth embodiments described above. The operation of water temperature switch SW1 is not related to control circuits 39 or 49, and this switch is not an essential element of the invention configuration. The water temperature switch SW1 is only provided in order to prevent overheating of engine 1.

However, the thermal load switch constituted by air temperature switch SW6 is an essential element of each of the third and fourth embodiments. It should be noted that, although an outside temperature switch SW6 is used as a thermal load switch in these embodiments, the invention is not limited to the use of such an outside temperature switch to perform this function. For example, it would be possible to utilize a vehicle speed switch, functioning to sense the speed at which the vehicle is moving, with motor 5a being set in operation only when the vehicle is moving at a slow speed (i.e., when a high thermal load is applied to condenser 3).

In the embodiments described above, the only power-consuming electrical components of the vehicle described are headlights 16 and 17. However it should be noted that the invention is not limited to a pair of headlights, and can be applied to other components which consume electrical power, such as windshield wiper motors, rear window demister, etc. It should be noted that headlights 16 and 17 will be mainly used during the hours of darkness, rather than during the daytime, so that the headlights would normally only be switched on when the outside temperature is low. Thus, due to this low outside temperature, there will be a reduced degree of temperature increase of the engine cooling water, so that motors 4a and 5a can be switched off, or rotated at low speed. It can be arranged that when a high thermal load is applied to condenser 3 during night operation of the vehicle, both of motors 4a and 5a are set in full operation. In this way, the cooling system can be used in a highly efficient manner. Furthermore, in the embodiments described above, one of the two electrically driven blowers (i.e., radiator air blower 4 and condenser air blower 5) is switched off or is made to rotate at low speed, by the control circuit (19, 29, 39 or 49). However it is equally possible to arrange that both of these blowers are switched off, or rotated at low speed, by the control circuit. In this case it would be essential to use both water temperature switch SW1 and outside temperature switch SW6. In addition, it would also be possible to connect water temperature switch SW1 and the thermal load switch in parallel with a control circuit (19, 29, 39 or 49), whereby blowers 4 and 5 would be set in operation when the engine cooling water temperature is high or when a high thermal load is applied to condenser 3.

With the present invention, as described above, one or both of the electrically powered blowers of the vehicle can be switched off or rotated at low speed when electrical power is being consumed by electrical apparatus of the vehicle. As a result, since the overall level of electrical power consumed by the vehicle is minimized, overloading of the generating capacity of the alternator is avoided, and discharging of the battery is prevented. In addition, the vehicle noise level is reduced. However when the temperature of the engine cooling water becomes high, or when a high thermal load is placed on the condenser of the vehicle air conditioner cooling system, the air blowers are set in operation by means of a water temperature switch or thermal load sensing switch, etc., so that overheating of the engine is prevented and the effectiveness of the air conditioning system is maintained.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A cooling system for radiator and condenser of vehicles with an air conditioner having a first blower (4) and a second blower (5) for cooling the radiator and the condenser so as to cool the engine cooling water and so as to condense the coolant, and a cooling cycle operation switch (10), which comprises;
    (a) engine cooling water temperature switch (SW1) connected between a power supply and the first blower and turned on and off in accordance with high and low temperature conditions of the engine cooling water;
    (b) relay switching means (8) for controlling said first and second blowers in accordance with the on-off conditions of said cooling cycle operation switch; and
    (c) a control circuit (9) having an on-off switch (9a, 30b, 40b or 50b) and a solenoid (9b, 30a, 40a, or 50a), and connected between said relay switching means and either said first blower or said second blower, the solenoid of said control circuit being connected to switches (SW3, SW4 and SW5) for electrical equipment such as headlights, wipers;
    whereby, when any one of said switches for the electrical equipment of the vehicle is turned off, said first and second blowers are operated at normal speed through said relay switching means and said control circuit, upon the operation of the cooling cycle operation switch, while when any one of said switches for said electrical equipment is turned on, said first blower is on-off controlled through said engine cooling water temperature switch (SW1) and said second blower remains operated through said relay switching means (8).

2. A cooling system for radiator and condenser of vehicles with an air conditioner having a first blower and a second blower as claimed in claim 1 wherein said control circuit comprises a change-over switch (30b, 30d in FIG. 3; 50b, 50d in FIG. 5), one of the contacts of which is connected to a resistor (31 in FIG. 3; 51 in FIG. 5) so as to operate said first blower or said second blower at low speed when said change-over switch is changed from a first position to a second position in accordance with the operation of any switches for the electrical equipment and the turning-on of said cooling cycle operation switch.

3. A cooling system for radiator and condenser of vehicles with an air conditioner having said first blower and said second blower as claimed in claim 2 wherein said on-off switch is a normally closed switch or said first contact is normally closed by the arm of said change-over switch.

4. A cooling system for radiator and condenser of vehicles with an air conditioner having said first blower and said second blower as claimed in claim 3 wherein said control circuit (9) is connected between said relay switching means (8) and said condenser blower (5) and said solenoid (40a in FIG. 4; 50a in FIG. 5) is connected to said switches for the electrical equipment through outside temperature switching means (SW6) as a thermal load switch.

5. A cooling system for radiator and condenser of vehicles with an air conditioner having the first and second blowers as claimed in claim 3 wherein when any of said switches for the electrical equipment is turned, on, said second blower is on-off controlled or is operated at low speed through said control circuit and said outside temperature switch in accordance with the outside temperature conditions.

6. A cooling system for radiator and condenser of vehicles with an air conditioner having said first blower and said second blower as claimed in claim 1 wherein said on-off switch is a normally closed switch or said first contact is normally closed by the arm of said change-over switch.

7. A cooling system for radiator and condenser of vehicles with an air conditioner having the first and second blowers as claimed in claim 6 wherein when any of said switches for the electrical equipment is turned on, said second blower is on-off controlled or is operated at low speed through said control circuit and said outside temperature switch means in accordance with the outside temperature conditions.

8. A cooling system for radiator and condenser of vehicles with an air conditioner having said first blower and said second blower as claimed in claim 6 wherein said control circuit (9) is connected between said relay switching means (8) and said condenser blower (5) and said solenoid (40a in FIG. 4; 50a in FIG. 5) is connected to said switches for the electrical equipment through outside temperature switching means (SW6) as a thermal load switch.

9. A cooling system for radiator and condenser of vehicles with an air conditioner having said first blower and said second blower as claimed in claim 1 wherein said first electrically driven blower is a radiator blower and said second blower is a condenser blower.

10. A cooling system for radiator and condenser of vehicles with an air conditioner having said first blower and said second blower as claimed in claim 1 wherein said control circuit (9) is connected between said relay switching means (8) and said condenser blower (5) and said solenoid (40a in FIG. 4; 50a in FIG. 5) is connected to said switches for the electrical equipment through outside temperature switching means (SW6) as a thermal load switch.

11. A cooling system for radiator and condenser of vehicles with an air conditioner having said first blower and second blower, as claimed in claim 10 wherein said outside temperature switch means is turned on when the outside temperature is higher than a predetermined temperature and is turned off when the outside temperature is lower than the predetermined temperature.

12. A cooling system for radiator and condenser of vehicles with an air conditioner having the first and second blowers as claimed in claim 11 wherein when any of said switches for the electrical equipment is turned on, said second blower is on-off controlled or is operated at low speed through said control circuit and said outside temperature switch in accordance with the outside temperature conditions.

13. A cooling system for radiator and condenser of a vehicle with an air conditioner for cooling engine cooling water and condensing coolant said system comprising: first and second blowers; a control circuit for stopping and operating at low speed one of the first and second blowers when at least one switch for electrical equipment of the vehicle is operated; a water temperature switch turned on and off responsive to a high or a low temperature condition of the engine cooling water and for operating one of said blowers by releasing the control of said control circuit; and a thermal load switch for operating one of said blowers by releasing the control of said control circuit when the thermal load to said condenser is large.

14. A method of operating the cooling system as claimed in claim 13 wherein the method further comprises the steps of:
(e) operating said second blower through said control circuit when said electrical equipment is not operated during the cooling cycle;
(f) operating said second blower in on-off control in accordance with the outside temperature conditions through said thermal load switch (SW6) when any switch or switches for the electrical equipment are operated during the cooling cycle; and
(g) operating said second blower at low speed through said control circuit when said thermal load switch is in the on condition during the cooling cycle.

15. A method for operating the cooling system for radiator and condenser of a vehicle with an air conditioner having first (4) and second (5) blowers, a control circuit (9) for stopping and operating said one of the blowers at low speed, and an engine cooling water temperature switch (SW1) for turning on and off said first blower in accordance with the temperature condition of the engine cooling water, and a thermal load switch (SW6) turning on and off said second blower in accordance with the outside temperature condition, which comprises the steps of:
(a) operating said first and second blowers (4;5) during the cooling cycle when at least one of said switches for said electrical equipment of the vehicle is operated;
(b) energizing said control circuit (9) when any switch or switches for the electrical equipment is operated during the cooling cycle and for releasing the control of said first blower;
(c) operating said first blower in accordance with the on-off control of said engine cooling water temperature switch (SW1) during the cooling cycle; and
(d) operating said first blower at low speed through said control circuit (9) when said engine cooling water temperature switch is in the off condition.

* * * * *